United States Patent [19]

Loyd, Jr.

[11] 4,070,995

[45] Jan. 31, 1978

[54] ROTARY ENGINE WITH COMBUSTION GAS FLOW-BACK FOR DIESEL OPERATION

[75] Inventor: Robert W. Loyd, Jr., Wyckoff, N.J.

[73] Assignee: Curtiss-Wright Corporation, Wood-Ridge, N.J.

[21] Appl. No.: 695,045

[22] Filed: June 11, 1976

[51] Int. Cl.² .............................................. F02B 53/02
[52] U.S. Cl. .................................................. 123/8.11
[58] Field of Search ................... 123/8.09, 8.11, 8.13, 123/8.45

[56] References Cited

U.S. PATENT DOCUMENTS

| 428,762 | 5/1890 | Sharpneck | 123/8.49 |
| 3,190,269 | 6/1965 | Tado | 123/8.11 |
| 3,795,227 | 5/1974 | Jones | 123/8.09 |

FOREIGN PATENT DOCUMENTS 2,420,617  11/1975  Germany ............................ 123/8.11

Primary Examiner—Carlton R. Croyle
Assistant Examiner—Michael Koczo, Jr.
Attorney, Agent, or Firm—Victor D. Behn; Arthur Frederick

[57] ABSTRACT

A rotary engine in which the engine is provided with leakage grooves in its trochoid surface so that high pressure combustion gases from a working chamber in its expansion phase can flow back into a chamber at an initial portion of its compression phase so as to increase the resulting temperature and pressure of the compression phase sufficient for Diesel operation.

4 Claims, 3 Drawing Figures

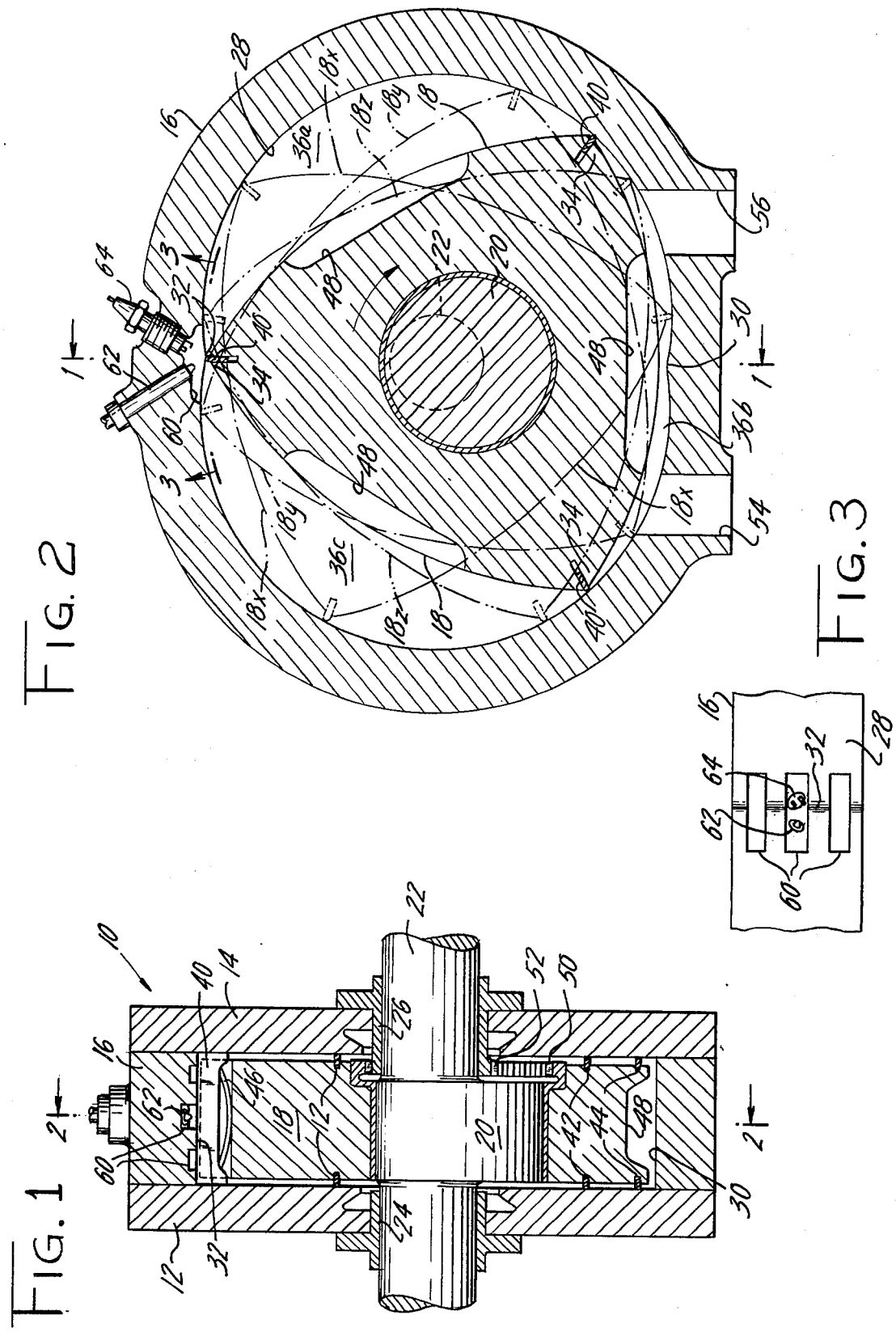

ROTARY ENGINE WITH COMBUSTION GAS FLOW-BACK FOR DIESEL OPERATION

BACKGROUND OF THE INVENTION

The invention relates to rotary engines of the type disclosed in U.S. Pat. No. 2,988,065 granted on June 13, 1961 to Wankel et al. Such rotary combustion engines are available commercially for operation on the Otto cycle with spark ignition with compression ratios of approximately 8:1 to 10:1. In addition, fuel injection versions of such spark-ignited rotary engines have been designed, for example, as shown in U.S. Pat. No. 3,246,636 granted Apr. 19, 1966 to Bentele. For diesel-type operation, higher compression ratios are required, for example, a compression rate of approximately 15:1 or higher. U.S. Pat. No. 3,331,358 granted July 18, 1967 to Muller et al is an example of a diesel rotary engine of this type.

At this point it should be noted that by compression ratio of an internal combustion engine is meant the ratio of the maximum to the minimum volume of a working chamber of the engine. Thus, an 8.5:1 compression ratio means that the maximum volume of a working chamber is 8.5 times the minimum volume. In a four-stroke cycle internal combustion engine having an 8.5:1 compression ratio, and taking in air at atmospheric pressure at a temperature of 70° F, the actual pressure in a working chamber, as a result of compression, may reach about 20 atmospheres and a temperature of about 760° F. It is this increase in temperature of the working fluid that causes the actual pressure to rise to about 20 atmospheres rather than, if there were no temperature rise, to only 8.5 atmospheres. Accordingly, for reasons of clarity, what is usually referred to as simply the compression ratio is herein termed the volumetric compression ratio.

As disclosed in said Wankel et al patent, the rotary engine has a multi-lobe cavity which preferably has basically an epitrochoidal profile. The shape of the epitrochoidal engine cavity determines the volumetric compression ratio. Thus, an epitrochoid having a smaller ratio of $a/b$ has a larger volumetric compression ratio, where $a$ is equal to one-half the length of the major axis of the epitrochoid and $b$ is equal to one-half the length of its minor axis. Today it is more common to express the shape of the epitrochoid in terms of a so-called "K" factor which is equal to the ratio $R/e$ where R is the radial distance from the center of the rotor to the tip of its apex seals and $e$ is the distance between the rotor center and the engine axis. In general, the magnitude of the K factor increases as the ratio $a/b$ decreases. Hence, for higher compression, a rotary engine of the type shown in said Wankel et al patent should have a high "K" factor.

As is evident from the disclosure of said Wankel et al patent, at high volumetric compression ratios the shape of each engine working chamber at its top dead center position becomes extremely thin in a radial direction and therefore combustion in the working chambers is subject to severe cooling or chilling by the radial walls of the chamber. For this reason, it is difficult to make a successful diesel-type rotary combustion engine of the type disclosed in the Wankel et al patent simply by changing the engine "K" factor to increase the engine volumetric compression ratio.

Diesel-type rotary combustion engines have been designed, for example, by using a supercharger as in U.S. Pat. No. 3,858,557 granted on Jan. 7, 1975 to Myers et al. Such diesel-type engines, however, require the added complexity of a supercharger. Diesel-type rotary combustion engines have also been designed using a generally square rotor mounted within a three-lobed epitrochoid with the porting designed to provide for double compression strokes. This latter type of rotary diesel is shown in U.S. Pat. No. 3,097,632 granted on July 16, 1963 to Froede et al. This latter configuration results in a substantially larger and heavier engine for a given power output than is obtainable with an engine configuration employing a generally triangular rotor mounted within a two-lobed epitrochoid.

SUMMARY OF THE INVENTION

An object of the invention resides in the provision of a novel and relatively simple diesel rotary engine avoiding the aforementioned problems encountered with prior diesel rotary engines. By diesel operation of an engine is meant that as the fuel is discharged into a working chamber of the engine it auto-ignites as a result of the temperature and pressure conditions of the charge in said chamber.

In accordance with the invention, the diesel rotary engine of the present invention has the normal configuration of a generally triangular rotor mounted within a three-lobed epitrochoid and the "K" factor of the engine epitrochoid is made such that the volumetric compression ratio would, in a conventional rotary engine, be substantially below that required for diesel operation; for example, this volumetric compression ratio preferably is about 8.5:1 to 10:1.

As already noted, in such a conventional rotary engine the pressure and temperature in each working chamber, as a result of the compression stroke, would reach about 20 atmospheres and 760° F. This is insufficient for diesel operation with normal diesel fuels. In general, the higher the pressure, the lower the temperature required for diesel operation and likewise the higher the temperature, the lower the pressure required, for diesel operation. As between the temperature and pressure factors, the temperature of the working fluid is considered to be the more important in determining whether or not diesel operation takes place. In fact, in general, for diesel operation to take place the temperature of the working fluid should be over about 900° F.

In accordance with the invention, the trochoid surface of a rotary engine is provided with leakage grooves to permit leakage of a sufficient quantity of high pressure and high temperature combustion gases from a working chamber in its expansion phase into a working chamber at an initial portion of its compression stroke in order to raise the pressure and the temperature of the working fluid at said initial portion of the compression stroke in order that the pressure and temperature of the working fluid at the end of the compression stroke is sufficiently high for diesel operation. For example, in a rotary engine having a volumetric pressure ratio of 8.5:1, if this combustion gas leakage is sufficient to raise the pressure of the working fluid at the beginning of its compression stroke from 1 to about 3 atmospheres, then the actual pressure and temperature of the working fluid at the end of the compression stroke should reach a pressure over 50 atmospheres and a temperature over 1000° F. This is more than high enough for diesel operation. If the initial increase in temperature of the working fluid caused by this combustion gas leakage were also taken into account, then the actual pressure and temperature at the end of the compression stroke should be even higher.

It therefore is a further object of the invention to provide a rotary engine with a by-pass passage such that a sufficient quantity of combustion gases from a working chamber going through its expansion stroke flow back through said passage into the following chamber when said chamber is in the initial portion of its compressionstroke for the purpose of raising the temperature and pressure attained by the charge in said following chamber as a result of its compression stroke such that said temperature and pressure are sufficiently high to cause fuel discharged into said following chamber approximately at the end of said compression stroke to auto-ignite, thereby effecting diesel operation.

U.S. Pat. No. 3,393,666 granted July 23, 1968 to Yamamoto et al, discloses a rotary engine in which the engine trochoid surface is provided with by-pass grooves for permitting any unburnt fuel in the combustion gases to flow back through these grooves from the trailing end of a working chamber undergoing its expansion stroke into the following working chamber in order to minimize the unburnt hydrocarbons in the engine exhaust. There is, however, no suggestion or disclosure in this Yamamoto et al patent that this flow-back of combustion gases might be used to effect diesel operation. Also, in the Yamamoto et al patent the grooves provided for combustion gas flow-back from a working chamber going through its expansion stroke into the following working chamber are of such length that this flow-back into the following working chamber starts while the following chamber is still open to its intake port and does not stop until after the expanding chamber opens to the exhaust port. This excessive length of the flow-back grooves has several disadvantages. First, any leakage through the grooves into the following working chamber while said following chamber is still open to the intake port will tend to reduce the amount of fresh charge taken into that chamber. In addition, if the expanding chamber opens to the exhaust port while said grooves still provide communication with the following chamber, then the pressure differential across said grooves will reverse whereupon there will be a pressure loss in the following working chamber. Co-pending application Ser. No. 695,046, now U.S. Pat. No. 4,040,392, of applicant's assignee filed concurrently herewith in the name of George H. Woodier, discloses an improvement of this groove construction of the Yamamoto et al patent so as to eliminate the aforesaid disadvantages.

Therefore, it is a still further object of the invention to provide a rotary diesel engine with by-pass grooves in its trochoid surface such that sufficient combustion bases can flow back from a working chamber undergoing its expansion stroke into the following working chamber such that fuel self-ignites when discharged into said following chamber shortly prior to completion of its compression stroke to effect diesel-type operation and such that said grooves are not of such length as to adversely affect engine operation.

Other objects of the invention will become apparent upon reading the following detailed description in connection with the drawings.

BRIEF DESCRIPTION OF THE DRAWINGS

FIG. 1 is an axial sectional view through a four-stroke cycle, rotary diesel engine embodying the invention and taken along line 1—1 of FIG. 2;

FIG. 2 is a sectional view taken along line 2—2 of FIG. 1; and

FIG. 3 is a view of the trochoid surface taken along line 3—3 of FIG. 2.

DESCRIPTION OF THE INVENTION

Referring to the drawing, a rotary combustion engine is schematically indicated at 10, the engine being generally similar to the type of rotary engine disclosed in the aforementioned patents. The engine 10 comprises an outer body or housing consisting of two axially-spaced end housings 12 and 14 and an intermediate or rotor housing 16, these housings being secured together to form the engine cavity therebetween. An inner body or rotor 18 is journaled for rotation within said housing cavity on an eccentric portion 20 of a shaft 22, said shaft extending through the end housings 12 and 14 and being supported by bearings 24 and 26 respectively in said end housings.

The peripheral inner surface 28 of the intermediate housing 16 is illustrated as having a two-lobe profile which preferably is basically an epitrochoid, said two lobes joining at diametrically opposed junctions or near-axis regions 30 and 32. The rotor or inner body 18 has a generally triangular profile with apex portions 34 having sealing cooperation with the trochoidal surface to form three engine working chambers 36 between the rotor 18 and engine housing 12, 14 and 16. These three working chambers are distinguished from each other by the reference letters $a$, $b$ and $c$ respectively. For this purpose each of the rotor apex portions 34 is provided with a seal 40 which extends across the rotor between the inner walls of the end housings 12 and 14, and the rotor also has suitable seals 42 and 44 on its end faces for sealing contact with said inner walls of the end housings. As is conventional, suitable springs preferably are provided behind each of the seals 40, 42 and 44. However, only a spring 46 behind each apex seal 40 has been illustrated. Each of the three peripheral surfaces of the rotor 18 is provided with a trough-like recess 46.

The rotary engine 10 also includes suitable gears 50 and 52 which are connected to the engine rotor 18 and end housing 14, respectively, to control the relative rotation of the rotor, such gearing being conventional in such engines. In addition, the engine 10 has an air intake passage 54 disposed adjacent to and on one side of the near-axis region 30 of the trochoid surface 28 and an exhaust passage 56 disposed adjacent to and on the other side of said near-axis region 30.

The engine structure so far described is conventional and is generally similar to that described in the aforementioned patents. With such an engine, each working chamber has a four-stroke cycle. Thus, during engine operation and with the engine rotor 18 rotating clockwise, as viewed in FIG. 2, when a working chamber 36 is located adjacent to the lobe junction 30 it is open to the intake passage 54 and is starting the first or intake stroke of its cycle as the volume of the chamber increases from a minimum volume condition to a maximum volume condition at which point the chamber has its intake charge and closes to the intake passage 54. Said chamber now goes through the second or compression stroke of its cycle as its volume decreases to compress its charge until the chamber again reaches a minimum volume condition, but this adjacent to the lobe junction 32. As hereinafter described, combustion is initiated in the working chamber preferably shortly before the compression stroke is completed. Thereafter, the chamber goes through its third or expansion stroke as its volume increases to its maximum condition and then goes through its fourth or exhaust stroke as the volume decreases to a minimum condition while the chamber is in communication with the exhaust passage 54. Each working chamber 36 in sequence goes through the same four-stroke cycle as the engine operates.

When the rotor 18 is in its full line position, as shown in FIG. 2, the pressure in the working chamber 36a is greater than the pressure in the following chamber 36c. This direction of the pressure differential across the apex seal 40 disposed between the working chambers 36a and 36c exists during the initial portion of this compression stroke of the chamber 36c and continues until the chamber 36a has opened substantially to the exhaust passage 56. The present invention takes advantage of this pressure differential to cause combustion gases from the chamber 36a, while this chamber is in its expansion stroke, to bleed or flow back into the following chamber 36c while the following chamber is in the initial portion of its compression stroke so as to raise the pressure and temperature attained by the air charge in said following chamber at the end of its compression stroke to the point where said conditions are sufficient for diesel operation. For this purpose, a plurality of circumferentially-extending side-by-side grooves or recesses 60 are provided in the trochoid surface 28 adjacent to the near-axis region 32. In addition, a fuel nozzle 62 is disposed adjacent to the near-axis region 32 so that fuel can be discharged into each working chamber 36 shortly before the chamber reaches its top dead center position at said near-axis region, that is, shortly before completion of its compression stroke, for example, when the rotor is in the dot-dash line position shown in FIG. 2 and designated 18x.

With this construction, when the rotor 18 is in its full line position, as illustrated in FIG. 2, combustion gases will flow back from chamber 36a (which is undergoing its expansion stroke) into the following working chamber 36c (which is in the initial portion of its compression stroke). This flow-back of combustion gases serves to raise the pressure and temperature attained by the air charge in said following working chamber 36c as a result of its compression stroke.

The grooves 60 are provided with a cross-sectional flow area and length of such magnitude that the flow-back of combustion gases through these grooves into a working chamber starting its compression stroke is sufficient to raise the pressure and temperature of the air charge in said chamber at the initial portion of the compression stroke so that the pressure and temperature attained by said air charge, shortly prior to the completion of its compression stroke, is sufficiently high that upon fuel injection at that time into the chamber through the nozzle 62, the fuel self-ignites, thereby effecting diesel operation. In general, if the temperature attained by the intake charge reaches 900° F, this is sufficient for the fuel to self-ignite although the actual temperature at which self-ignition of fuel will take place will vary to some extent with the pressure. Thus, at higher pressures the fuel will self-ignite at a lower temperature.

The magnitude of the combustion gas flow-back into each working chamber 36 through the grooves 60 will increase if the length of these grooves is increased because there then is a longer time for this flow-back. Also, the magnitude of this flow-back obviously increases if the cross-sectional flow area of the grooves 60 is increased. The required magnitude of this combustion gas flow-back to effect diesel operation is greater for engines of lower volumetric compression ratio. Thus, a rotary engine 10 having a volumetric compression ratio of 10:1 requires a smaller magnitude of combustion gas flow-back into each working chamber 36 for diesel operation than a rotary engine having a volumetric compression ratio of only 8.5:1.

In a rotary engine 10 having a compression ratio of about 8.5:1, if the grooves 60 have a length and cross-sectional area such that the combustion gas flow-back into each working chamber is sufficient to raise the initial pressure from 1 to about 3 atmospheres, then, as already stated, the intake charge in said chamber should attain a temperature (over 1000° F) as a result of the compression stroke, sufficient for diesel operation.

Accordingly, with such an engine, fuel is discharged from the nozzle 62 into each working chamber 36 shortly before completion of its compression stroke whereupon this fuel will self-ignite. The engine 10 thereby operates as a diesel even though the volumetric compression ratio of the engine is only 8.5:1. In contrast, for a conventional diesel engine, volumetric compression ratios of the order of 15:1 are required. As in conventional automotive diesels, a spark or glow plug 64 or other form of hot spot is provided for the purpose of starting the diesel engine 10.

It is important that the grooves 60 are so positioned and are of such length that an apex seal 40 does not start to move across said grooves until the following working chamber 36 has already been closed to the intake passage 54. Thus, as shown in FIG. 2, when the rotor 18 is in its dot-dash line position designated by 18y, the working chamber 36c has just closed to the intake passage 54 and the apex seal 40 between the working chambers 36c and 36a has not yet reached the grooves 60. This is important because if the chambers 36c and 36a were interconnected by the grooves 60 before the chamber 36c closed to the intake passage 54, the leakage of the relatively high pressure combustion gases from the chamber 36a into the chamber 36c would prematurely raise the pressure in the chamber 36c thereby reducing the magnitude of the air charge drawn into the chamber 36c from the intake passage 54 to reduce the potential engine power output. In addition, this premature leakage of combustion gases from the chamber 36a, then in its expansion stroke, would result in an unnecessary loss in engine power.

In addition, the grooves 60 are so positioned and are of such length that an apex seal 40 moves beyond said grooves before the working chamber 36 on its leading side has moved into substantial communication with the exhaust passage 56. Thus as shown in FIG. 2, when the rotor 18 is in its dot-dash line position designated 18z, the apex seal 40 at the trailing end of the working chamber 36a has already moved beyond the grooves 60 and said chamber is about to open to but has not as yet opened to the exhaust passage 56. This is important because once the chamber 36a moves into substantial communication with the exhaust passage 56, the pressure differential across the trailing apex seal reverses. That is, the pressure in the following working chamber 36c then becomes larger than the pressure in the chamber 36a. If an apex seal 40 were still moving across the grooves 60 when this reversal of the pressure differential occurs, then some of the high compression pressure in the following chamber 36c would escape through the grooves 62 into the chamber 36a with resulting loss in engine power.

The grooves 60 perform the further function of permitting any unburnt fuel which might accumulate at the trailing end of a working chamber to blow back through the grooves into the following working chamber. This feature is more fully described and is claimed in the aforementioned co-pending application of George H. Woodier.

As illustrated, the nozzle 62 and spark plug 64 both communicate with the engine working chambers 36 through one of the grooves 60, preferably for reasons of symmetry, through the central groove 60. With this arrangement, the recesses through which the nozzle 62 and spark plug 64 communicate with the engine working chambers are scavanged after each combustion phase by the flow back of combustion gases through the grooves 60.

It should be understood that the invention is not limited to the specific details of construction and arrangement thereof herein illustrated and that changes and modifications may occur to one skilled in the art without departing from the spirit or scope of the invention.

What is claimed is:

1. The method of operating a four-stroke cycle, rotary combustion engine having an outer body with an internal cavity in which the peripheral surface of said cavity has a two-lobe profile and the two lobes are joined by two regions disposed relatively near to the engine axis and an inner body of generally triangular profile mounted within said outer body profile with the apex portions of said inner body having sealing cooperation with said two-lobe peripheral surface to form three working chambers between the inner and outer bodies with the volume of said chambers increasing and decreasing in response to relative rotation of said inner and outer bodies, and said outer body also having an intake port and an exhaust port for sequential communications with said working chambers and disposed adjacent to and on opposite sides of one of said near-axis regions, said method comprising the steps of:
   a. supplying an air charge into each working chamber as the chamber expands to provide its intake stroke while it is in communication with said intake port;
   b. compressing said charge in each chamber as said chamber volume decreases to provide its compression stroke;
   c. discharging fuel into each chamber when said chamber has approximately completed its compression stroke;
   d. expanding the resulting combustion gases in each chamber as said chamber volume again increases to provide its expansion stroke;
   e. exhausting the combustion gases from each chamber as said chamber volume again decreases and is in communication with said exhaust port to provide its exhaust stroke; and
   f. by-passing a sufficient portion of the combustion gases from each working chamber, as it undergoes its expansion stroke, back into the following chamber after said following chamber has started its compression stroke so that the pressure and temperature attained by the charge in said following chamber as a result of said compression stroke is sufficient to cause the fuel discharged into said chamber to self-ignite therein thereby effecting diesel operation.

2. A rotary combustion diesel engine comprising:
   a. an outer body having an internal cavity in which the peripheral surface of said cavity has a two-lobe profile and the two lobes are joined by two regions disposed relatively near to the axis of said cavity;
   b. an inner body of generally triangular profile mounted for relative rotation within said outer body, the apex portions of said inner body having sealing cooperation with said two-lobe peripheral surface to define three working chambers which vary in volume in response to said relative rotation;
   c. said outer body also having an intake port and an exhaust port for sequential communication with said working chambers and disposed adjacent to and on opposite sides of one of said near-axis regions such that as the engine operates each working chamber goes through a four-stroke cycle in which in the first stroke the chamber volume increases while in communication with the intake passage, in its second stroke the chamber approaches the other of said near-axis regions to decrease in volume and compress its air charge whereupon combustion takes place in said chamber adjacent to said other near-axis region, in its third stroke the chamber increases in volume as the combustion gases expand and in its fourth stroke the chamber decreases in volume while in communication with the exhaust passage to discharge its combustion gases, the volumetric compression ratio of each of said chambers being less than about 15:1 such that said compression ratio is less than that normally required for diesel operation;
   d. means for discharging fuel into each working chamber after the air charge in said chamber has been substantially compressed; and
   e. said outer body also having circumferentially extending groove means in its two-lobe peripheral surface adjacent to said other near-axis region, said groove means being so positioned that an apex portion of the inner body does not reach the groove means until the working chamber on its trailing side has closed to the intake port and an apex portion of the inner body moves beyond said groove means before the working chamber on the leading side of said apex portion opens substantially to the exhaust port and said groove means having a flow cross-sectional area which is sufficiently large so that as an apex portion is passing over said groove means sufficient combustion gases flow back therethrough from the working chamber on the leading side of said apex portion into the following working chamber on the trailing side which then is in an initial portion of its compression stroke so as to raise the pressure and temperature of the charge in said following chamber to a point where the subsequent compression in said following chamber causes the pressure and temperature of its charge to reach magnitudes sufficient for self-ignition of the fuel discharged therein to provide diesel operation.

3. A rotary combustion engine as claimed in claim 2 and in which said fuel discharge means communicates with the engine working chambers through said groove means.

4. A rotary combustion engine as claimed in claim 2 and in which said groove means comprises a plurality of side-by-side grooves and said fuel discharge means discharges fuel into said working chambers through one of said grooves.

* * * * *